United States Patent
Inoue et al.

(10) Patent No.: US 11,135,685 B2
(45) Date of Patent: Oct. 5, 2021

(54) WORKPIECE SUPPORT DEVICE

(71) Applicant: FANUC CORPORATION, Yamanashi (JP)

(72) Inventors: Toshihiko Inoue, Yamanashi (JP); Tooru Nagai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 7 days.

(21) Appl. No.: 16/892,806

(22) Filed: Jun. 4, 2020

(65) Prior Publication Data

US 2021/0053162 A1 Feb. 25, 2021

(30) Foreign Application Priority Data

Aug. 23, 2019 (JP) .............................. JP2019-152671

(51) Int. Cl.
*B23K 37/04* (2006.01)
*B23K 37/047* (2006.01)
*B23K 9/32* (2006.01)

(52) U.S. Cl.
CPC .............. *B23K 37/047* (2013.01); *B23K 9/32* (2013.01); *B23K 37/0461* (2013.01)

(58) Field of Classification Search
CPC .......................................... B23K 37/04–0538
USPC ........ 228/47.1–49.6, 44.3–44.7; 219/121.58, 219/158
See application file for complete search history.

(56) References Cited

U.S. PATENT DOCUMENTS

| 2,830,170 | A | * | 4/1958 | Richard | B23K 37/0452 219/159 |
| 4,805,829 | A | * | 2/1989 | Pege | B23Q 1/0009 219/125.1 |
| 4,831,234 | A | * | 5/1989 | Myers | B23K 9/028 219/125.11 |
| 5,839,645 | A | * | 11/1998 | Onitsuka | H01L 24/78 228/180.22 |
| 2011/0163490 | A1 | * | 7/2011 | Nagai | H02G 11/02 269/57 |

(Continued)

FOREIGN PATENT DOCUMENTS

| DE | 2313130 A1 | * | 9/1974 | ........... B23K 11/318 |
| EP | 0621112 A1 | | 10/1994 | |
| EP | 0979705 A2 | * | 2/2000 | ......... B23K 37/0452 |

(Continued)

*Primary Examiner* — Kiley S Stoner
(74) *Attorney, Agent, or Firm* — Maier & Maier, PLLC

(57) ABSTRACT

A workpiece support device including a base; a conducting rotary table that supports a workpiece and that is rotatable about a horizontal rotation axis; a motor that rotationally drives the rotary table; a collecting brush disposed on the base slidable on the outer circumferential surface of a conducting shaft fixed to the rotary table and extending along the rotation axis; a connection terminal that is electrically connected to the collecting brush and to which an external cable is connected; and a liquid-proof cover surrounding the collecting brush and the outer circumferential surface of the shaft. The liquid-proof cover includes an upper back-plate portion that is disposed at the same position as the rear end of the motor, and a lower back-plate portion located below the upper back-plate portion and forming a recess. The connection terminal penetrates through the lower back-plate portion and projects into the recess.

3 Claims, 11 Drawing Sheets

(56) References Cited

U.S. PATENT DOCUMENTS

2019/0076968 A1* 3/2019 Inoue .................. B23K 37/047

FOREIGN PATENT DOCUMENTS

| JP | H06-143186 A | 5/1994 |
|----|--------------|--------|
| JP | 2012-250241 A | 12/2012 |
| JP | 2012-250242 A | 12/2012 |
| JP | 2019-048310 A | 3/2019 |

* cited by examiner

WORKPIECE SUPPORT DEVICE

CROSS-REFERENCE TO RELATED APPLICATIONS

This application is based on Japanese Patent Application No. 2019-152671, the contents of which are incorporated herein by reference.

FIELD

The present disclosure relates to a workpiece support device.

BACKGROUND

A known workpiece support device has a rotary table that rotates a workpiece supported thereon when, for example, the workpiece is to be arc-welded by an arc-welding robot (for example, see Japanese Unexamined Patent Application, Publication No. 2012-250241). In the workpiece support device in Japanese Unexamined Patent Application, Publication No. 2012-250241, a connection terminal via which an external cable is connected to a current collecting means electrically connected to the rotary table is disposed so as to be oriented either in the left or right direction perpendicular to the rotation axis of the rotary table.

SUMMARY

An aspect of the present disclosure is a workpiece support device including: a base; a conducting rotary table that supports a workpiece and that is supported by the base so as to be rotatable about a horizontal rotation axis; a motor that is disposed parallel to and offset from the rotation axis and that rotationally drives the rotary table; a collecting brush disposed on the rear side of the base so as to be slidable on the outer circumferential surface of a conducting shaft fixed to the rotary table and extending along the rotation axis; a connection terminal that is electrically connected to the collecting brush by a conducting member and to which an external cable connected to an external welding power supply is connected; and a liquid-proof cover surrounding the collecting brush and the outer circumferential surface of the shaft in a liquid-tight state. The liquid-proof cover includes an upper back-plate portion that is disposed at substantially the same position as the rear end of the motor, and a lower back-plate portion located below the upper back-plate portion and forming a recess recessed toward the front side. The connection terminal penetrates through the lower back-plate portion in the thickness direction thereof and projects into the recess.

DETAILED DESCRIPTION OF EMBODIMENTS

Figure 1:
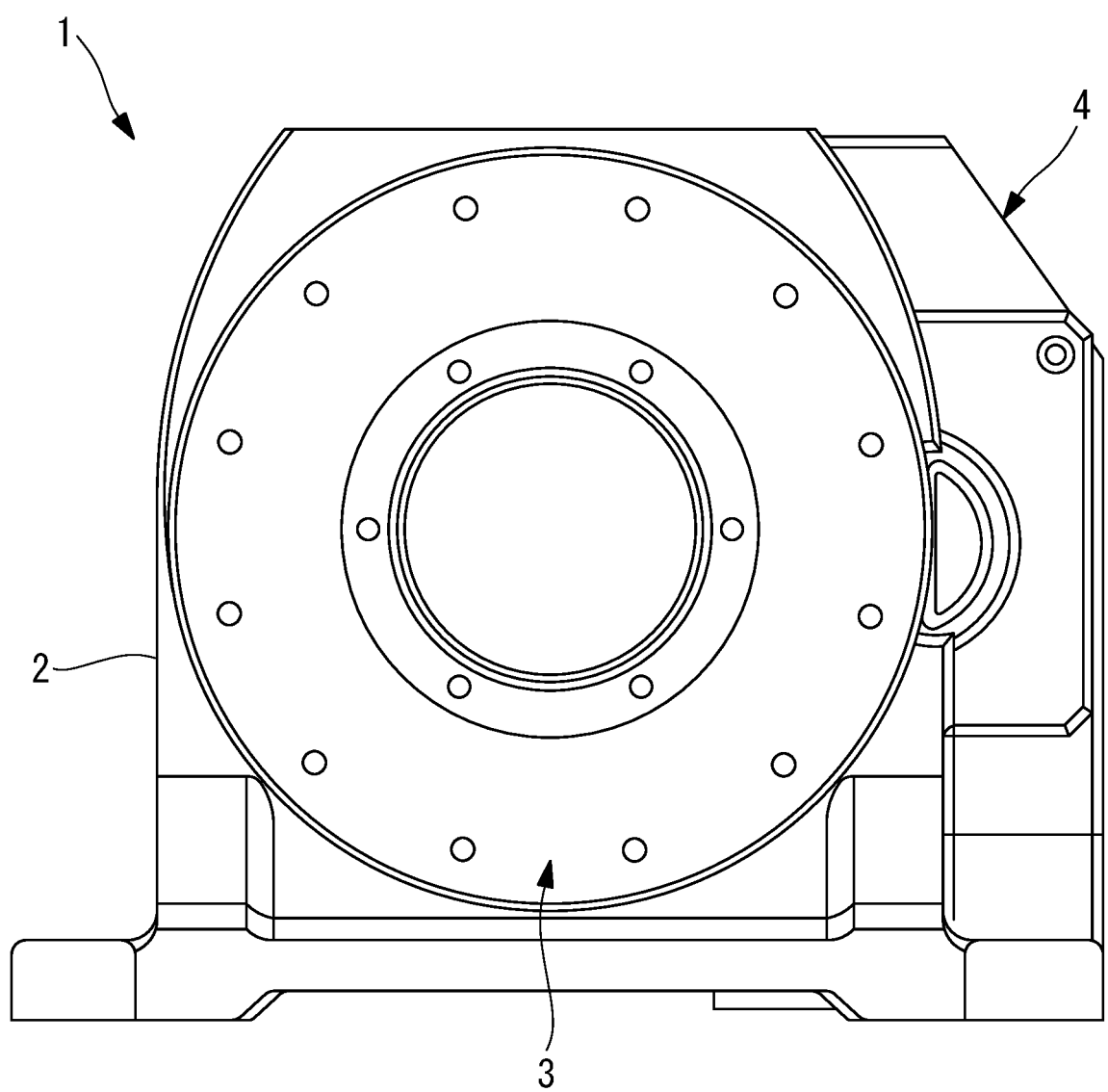
FIG. 1 is a front view of a workpiece support device according to an embodiment of the present disclosure.
Figure 2:
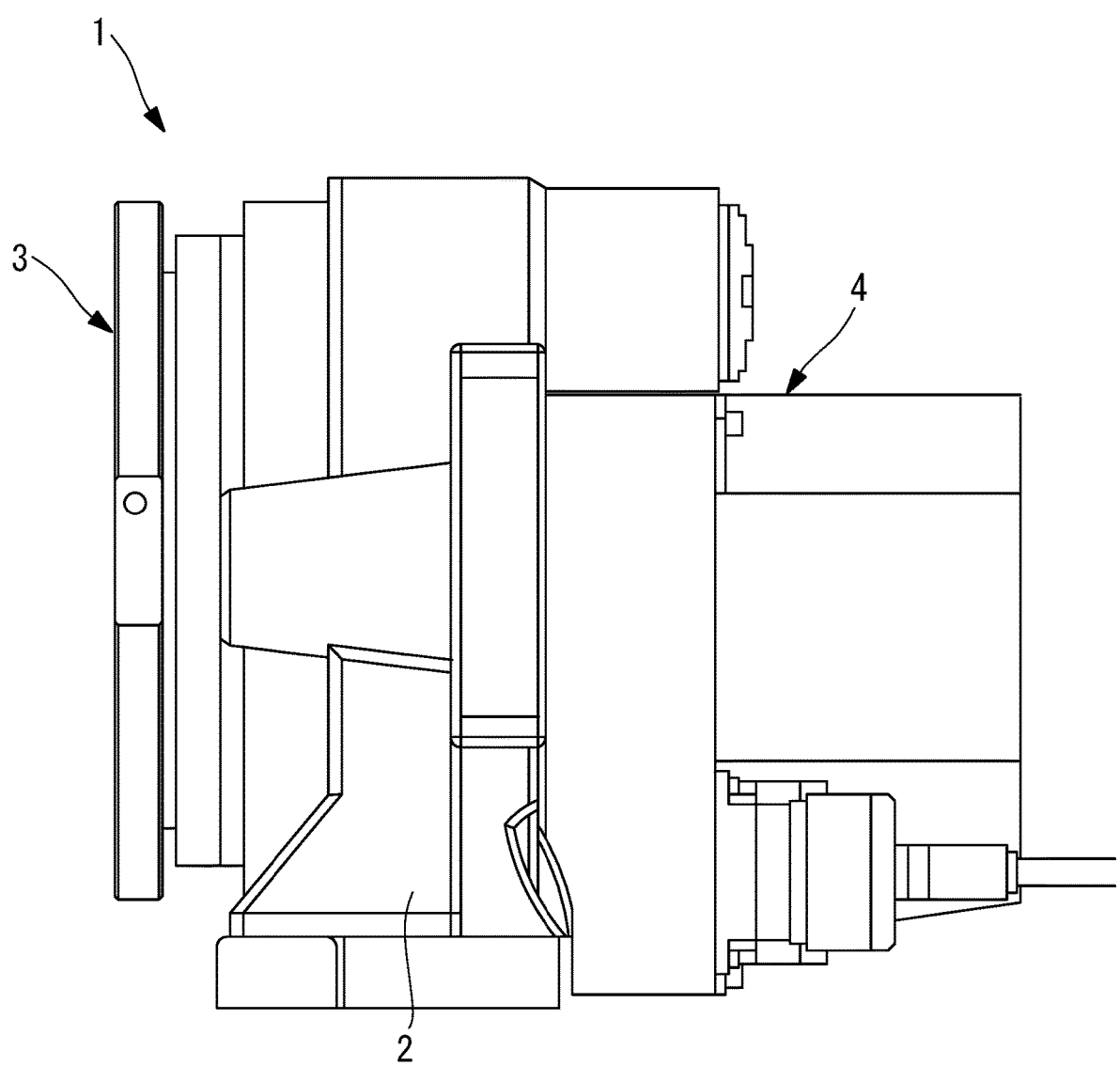
FIG. 2 is a side view of the workpiece support device in FIG. 1.
Figure 3:
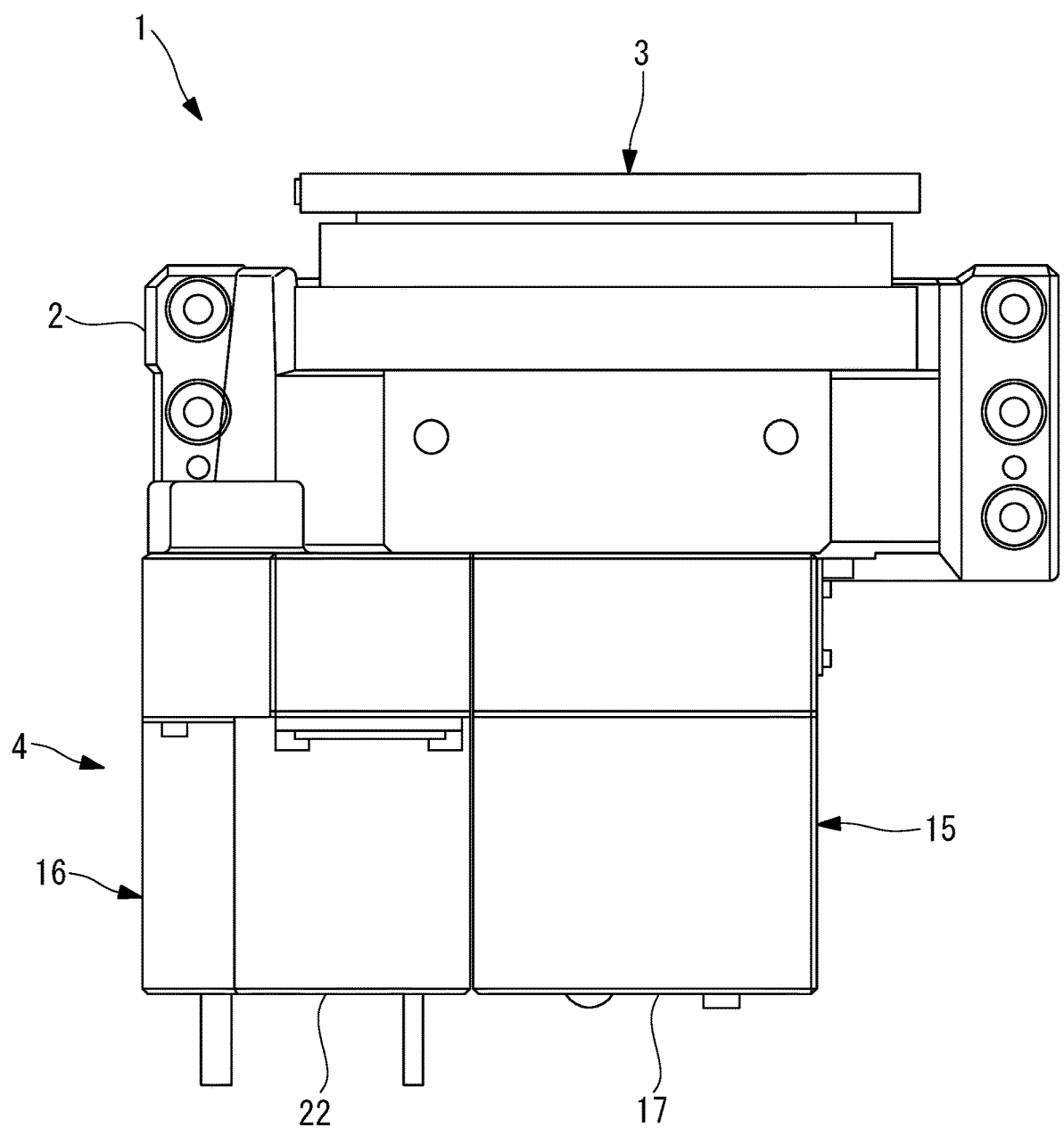
FIG. 3 is a plan view of the workpiece support device in FIG. 1.

A workpiece support device 1 according to an embodiment of the present disclosure will be described below with reference to the drawings. As shown in FIGS. 1 to 3, the workpiece support device 1 according to this embodiment includes: a base 2 disposed on the floor or the like; a rotary table 3 supported so as to be rotatable about a horizontal rotation axis A, relative to the base 2; and a driving mechanism 4 that rotationally drives the rotary table 3. The rotary table 3 is disposed on the front side of the workpiece support device 1. A cylindrical shaft 5 extending along the rotation axis A is fixed to the rotary table 3.

Figure 4:
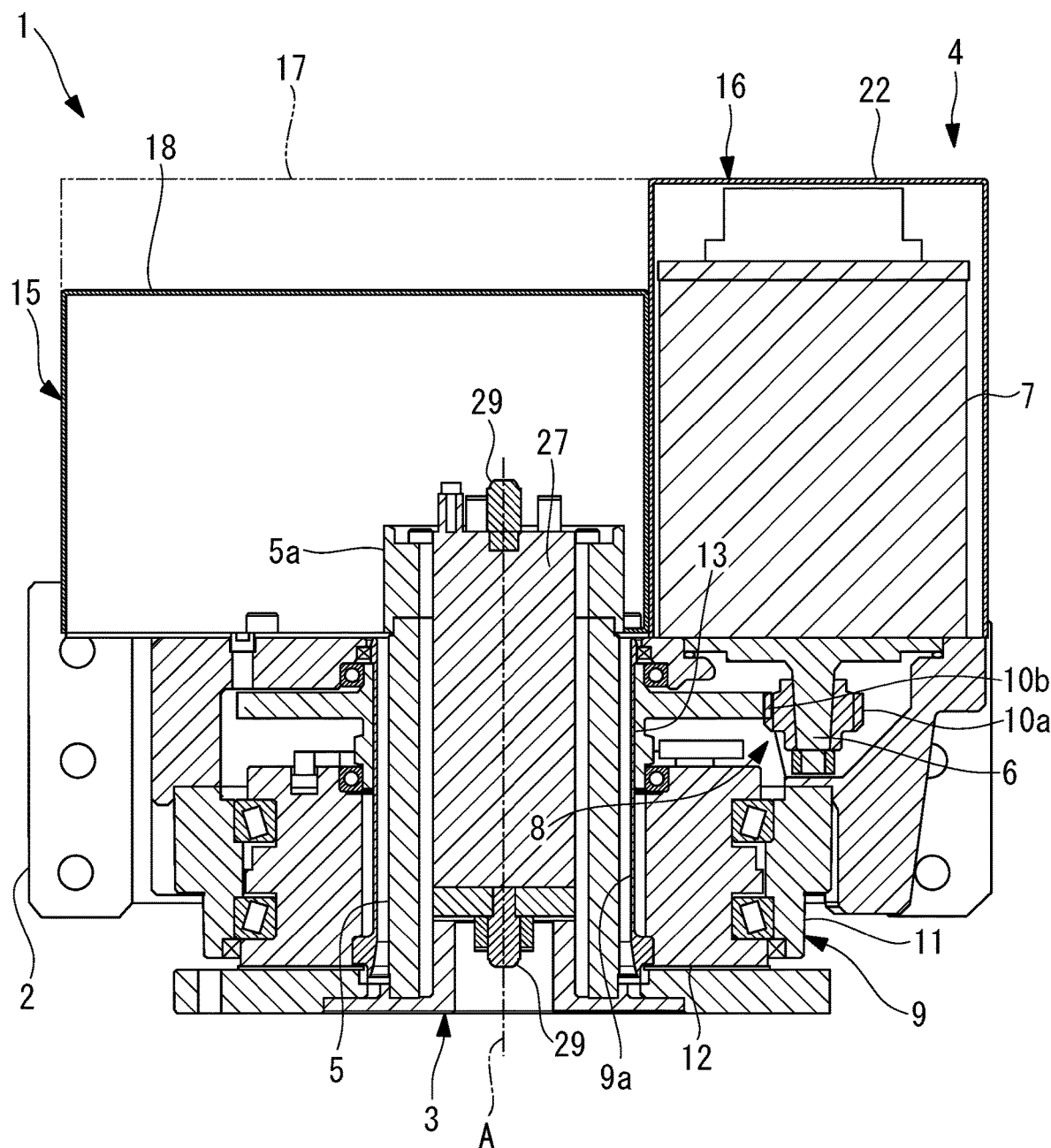
FIG. 4 is a horizontal sectional view of the workpiece support device in FIG. 1, taken along a horizontal plane including the rotation axis.

The rotary table 3 and the shaft 5 are formed of an electrically conducting material. As shown in FIG. 4, the driving mechanism 4 includes a motor 7 having a motor shaft 6, which is disposed parallel to the rotation axis A of the rotary table 3 and offset therefrom in the horizontal direction, and a reduction mechanism 8 that reduces the rotation speed of the motor 7 and transmits the rotation to the rotary table 3.

The reduction mechanism 8 includes a hollow reduction gear 9 and a pair of gears 10a and 10b that reduce the rotation speed of the motor 7 by one step and input the rotation to the reduction gear 9. The reduction gear 9 includes: an external casing 11 fixed to the base 2; an output shaft 12 that is supported so as to be rotatable about the rotation axis A, relative to the external casing 11, and that has a hollow part 9a; and an input shaft 13 that inputs the rotation of the motor 7 reduced by the gears 10a and 10b.

Figure 5:
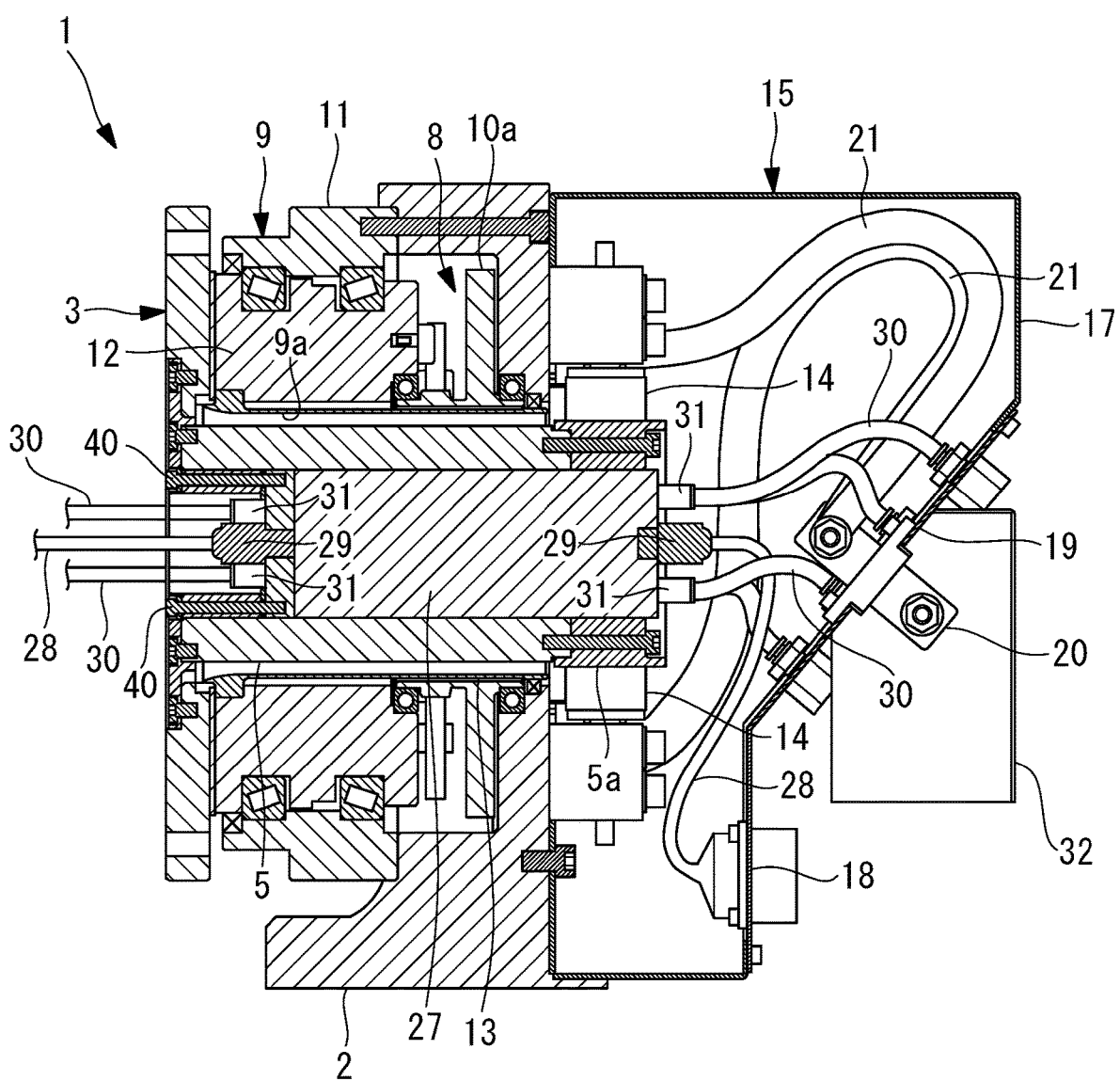
FIG. 5 is a vertical sectional view of the workpiece support device in FIG. 1, taken along a vertical plane including the rotation axis.

As shown in FIGS. 4 and 5, the shaft 5 penetrates through the hollow part 9a in the reduction gear 9, and an outer circumferential surface 5a thereof is exposed on the rear side of the workpiece support device 1, which is on the opposite side to the rotary table 3. Two collecting brushes 14 are pressed against the exposed outer circumferential surface 5a from the radially outer side, at different positions in the circumferential direction, and thus are slidably in contact therewith.

In the example shown in FIGS. 4 and 5, the motor 7 is disposed directly beside the rotation axis A, and the collecting brushes 14 are disposed at two positions on the shaft 5, i.e., above and below the shaft 5. The collecting brushes 14 are pressed against the outer circumferential surface 5a of the shaft 5 by springs (not shown) and are maintained in contact therewith.

As shown in FIGS. 4 and 5, the workpiece support device 1 includes a liquid-proof cover 15 that surrounds the collecting brushes 14 and the outer circumferential surface 5a of the shaft 5 exposed on the rear side in a liquid-tight state, and a motor cover 16 that surrounds the motor 7 in a liquid-tight state. The liquid-proof cover 15 and the motor cover 16 are formed of metal plates separately attached to the back surface of the base 2 in a removable manner.

As shown in FIGS. 4 and 5, the liquid-proof cover 15 includes an upper back-plate portion 17 disposed at substantially the same rear-side position as the rear end of the motor 7, and a lower back-plate portion (recess) 18 located below the upper back-plate portion 17, at a position closer to the front side than the upper back-plate portion 17 is. The lower back-plate portion 18 includes an inclined back-plate portion (inclined portion) 19 that is inclined downward toward the front side from the upper back-plate portion 17.

With this configuration, the lower back-plate portion 18 below the upper back-plate portion 17 forms a recess, which is recessed further toward the front side than the upper back-plate portion 17 is. In this embodiment, a connection terminal 20 is provided so as to penetrate through a metal plate constituting the inclined back-plate portion 19 in the thickness direction thereof and so as to extend from the inside to the outside of the liquid-proof cover 15.

Inside the liquid-proof cover 15, the connection terminal 20 is connected to the collecting brushes 14 through conducting cables (conducting members) 21. The connection terminal 20 exposed on the outside of the liquid-proof cover 15 projects obliquely downward into the recess formed by the lower back-plate portion 18.

Figure 6:
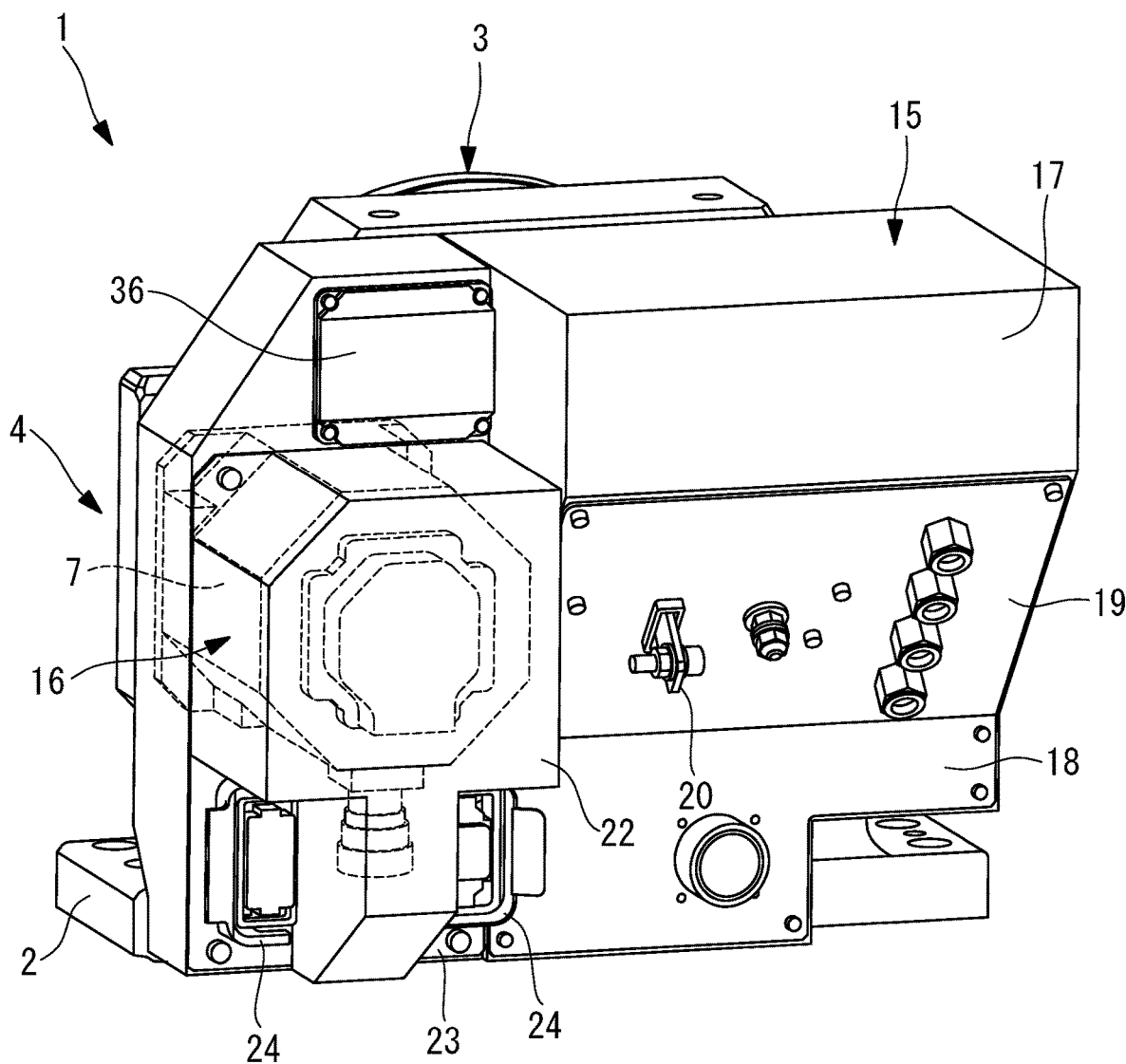
FIG. 6 is a perspective view of the workpiece support device in FIG. 1, as viewed from the rear side.

As shown in FIG. 6, the motor cover 16 is shaped such that it can be put on the motor 7 from the rear-end side, and includes a back-plate cover portion 22 disposed at a position covering the rear end of the motor 7, and a recess cover portion 23 forming a recess recessed further toward the front side than the back-plate cover portion 22 is. Motor connectors 24, which are connected to a connector of the motor 7 via relay cables (not shown), are fixed to the recess cover portion 23 so as to face backward.

Figure 7:
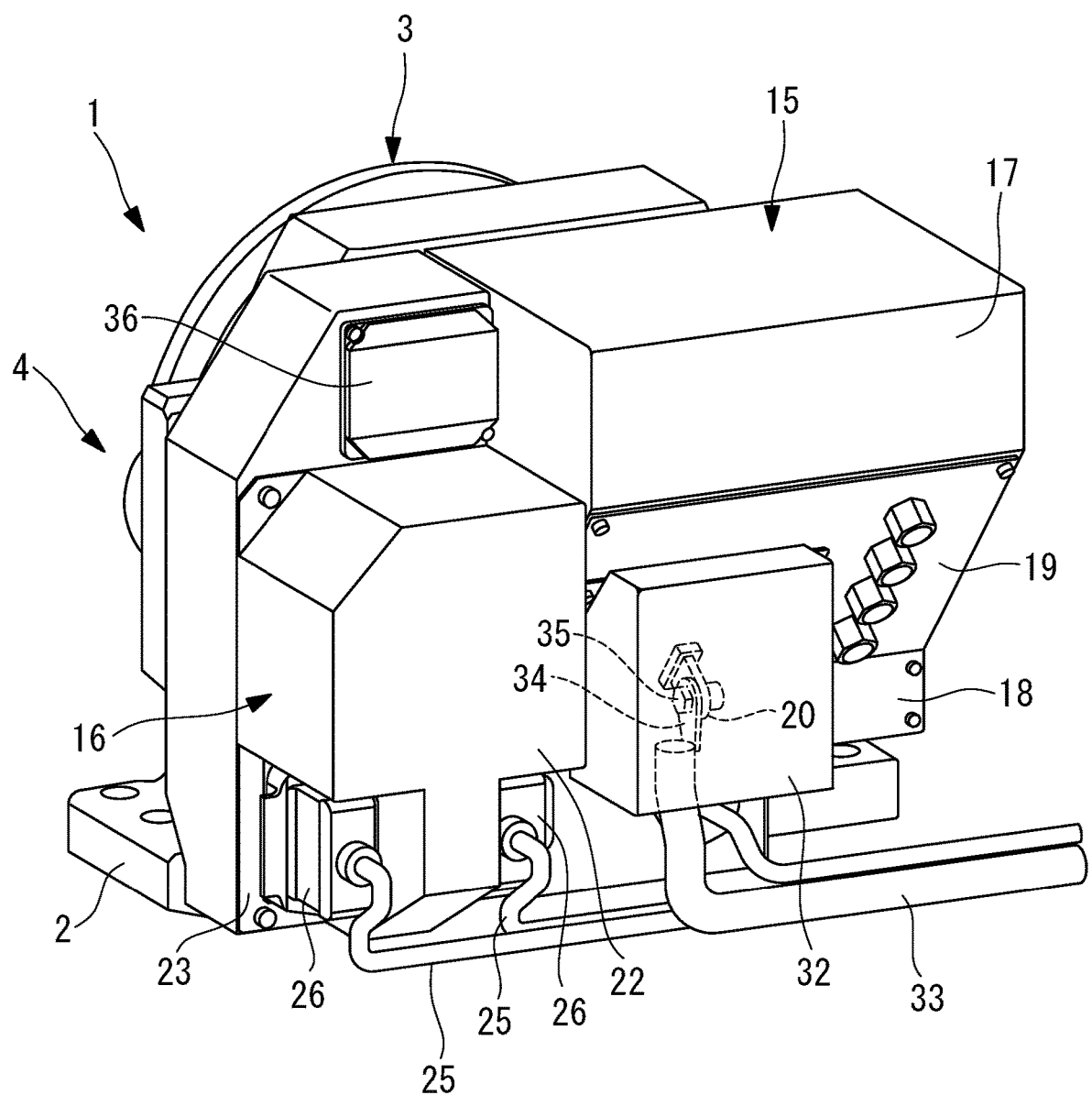
FIG. 7 is a perspective view showing an example in which an external cable and an external motor cable are connected to the workpiece support device in FIG. 1 and are led to the right side.

With this configuration, as shown in FIG. 7, connectors 26 of external motor cables 25, which are connected to the motor connectors 24 from the rear side toward the front side, are accommodated in the recess formed by the recess cover portion 23, at a position closer to the front side than the back-plate cover portion 22 is. In FIGS. 4 and 5, reference sign 27 denotes a rotary joint via which a pipe 28 and signal cables 30 from the outside are connected to the rotary table 3, reference sign 28 denotes the pipe, reference sign 29 denotes a pipe-connecting joint, reference signs 30 denote the signal cables, and reference signs 31 denote signal-cable connectors.

By removing bolts 40 fastened from the rotary table 3 side, the rotary joint 27 can be extracted to the rear side of the base 2 and thus can be removed from the inside of the shaft 5. In FIG. 5, reference sign 32 denotes a connecting-portion cover that covers the connecting portion between the connection terminal 20 and the external cable 33.

Figure 8:
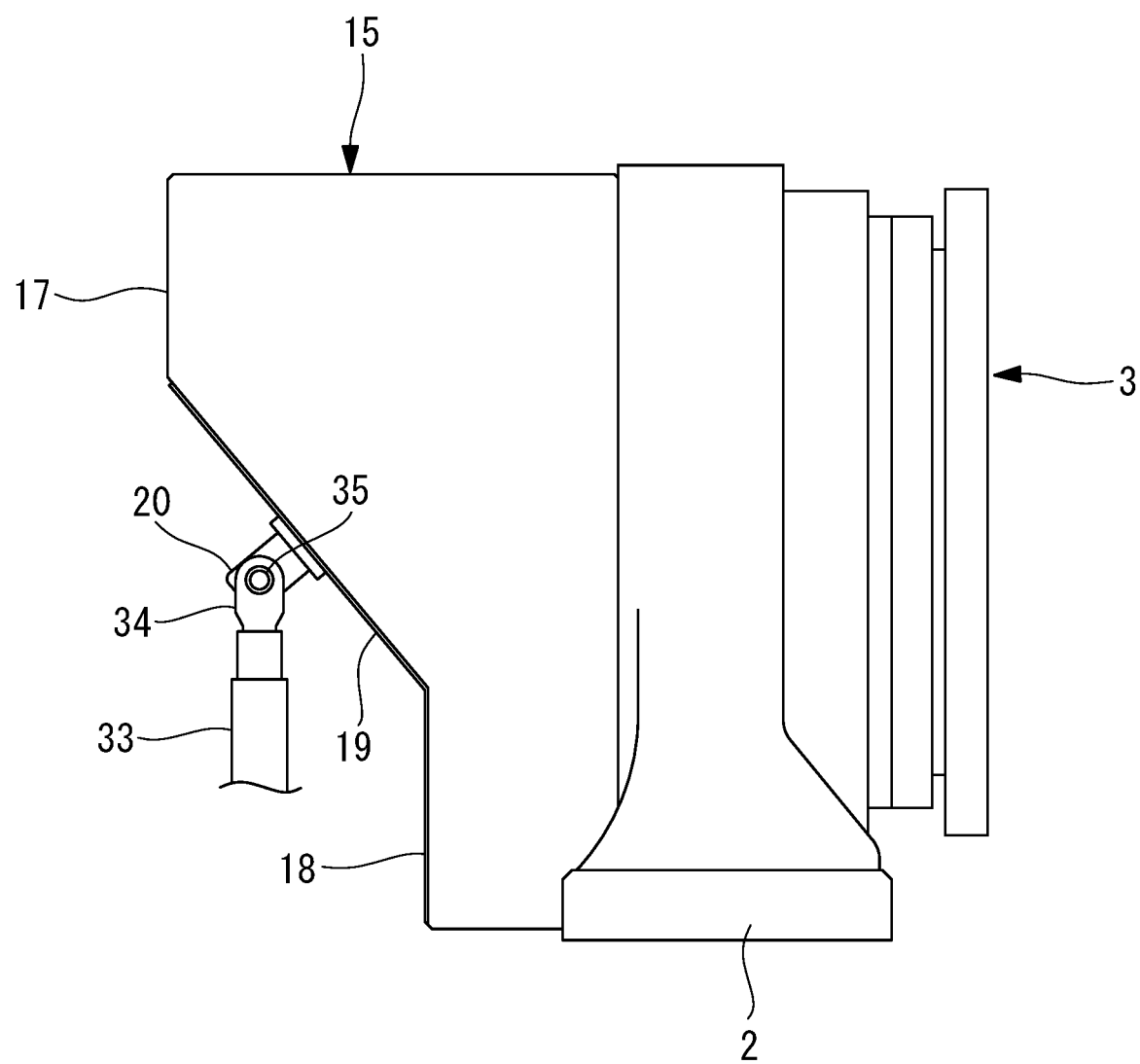
FIG. 8 is a side view showing the connection terminal and the external cable disposed in the recess in the workpiece support device in FIG. 1.

The advantages of the thus-configured workpiece support device 1 according to this embodiment will be described below. In the workpiece support device 1 according to this embodiment, as shown in FIGS. 7 and 8, the external cable 33 is connected to the connection terminal 20, which is exposed on the inclined back-plate portion 19 of the back surface of the liquid-proof cover 15. The connection is accomplished by, for example, fastening a crimp contact 34 attached to the external cable 33 to the connection terminal 20 with a bolt 35 and a nut. As a result, the collecting brushes 14 are connected to the anode of an external welding power supply (not shown) via the external cable 33.

More specifically, the workpiece fixed to the rotary table 3 is connected to the anode of the external welding power supply via the rotary table 3, the shaft 5, the collecting brushes 14, the conducting cables 21, the connection terminal 20, the crimp contact 34, and the external cable 33. A welding torch fixed to the end of the wrist of a welding robot (not shown) is connected to the cathode of the external welding power supply.

The connectors 26 of the external motor cables 25 are connected to the motor connectors 24 provided on the motor cover 16. By rotating the rotary table 3 about the rotation axis A in this state by actuating the motor 7, it is possible to generate an arc between the workpiece and the welding torch to weld them together while changing the orientation of the workpiece.

Because the collecting brushes 14 are in contact with the outer circumferential surface 5a of the shaft 5, even when the rotary table 3 is rotated by one cycle or more, the rotary table 3 can be kept connected to the anode of the external welding power supply. In this case, particularly in the case where carbon brushes are used as the collecting brushes 14, the entry of dust between the collecting brushes 14 and the outer circumferential surface 5a of the shaft 5 needs to be prevented. In this embodiment, because the collecting brushes 14 and the outer circumferential surface 5a of the shaft 5 are surrounded by the liquid-proof cover 15 in the liquid-tight state, it is possible to prevent the entry of dust into the sliding plane from the outside and thus to maintain good conductivity.

In this embodiment, the connection terminal 20, via which the collecting brushes 14 are connected to the external welding power supply through the conducting cables 21, projects obliquely downward into the recess formed in the inclined back-plate portion 19 of the lower back-plate portion 18, below the upper back-plate portion 17. With this configuration, as shown in FIG. 8, the connection terminal 20 and the external cable 33 connected to the connection terminal 20 are accommodated in the recess formed below the upper back-plate portion 17 and thus are prevented from projecting backward from the rear-end position of the workpiece support device 1, which is defined by the rear end of the motor 7.

Figure 9:
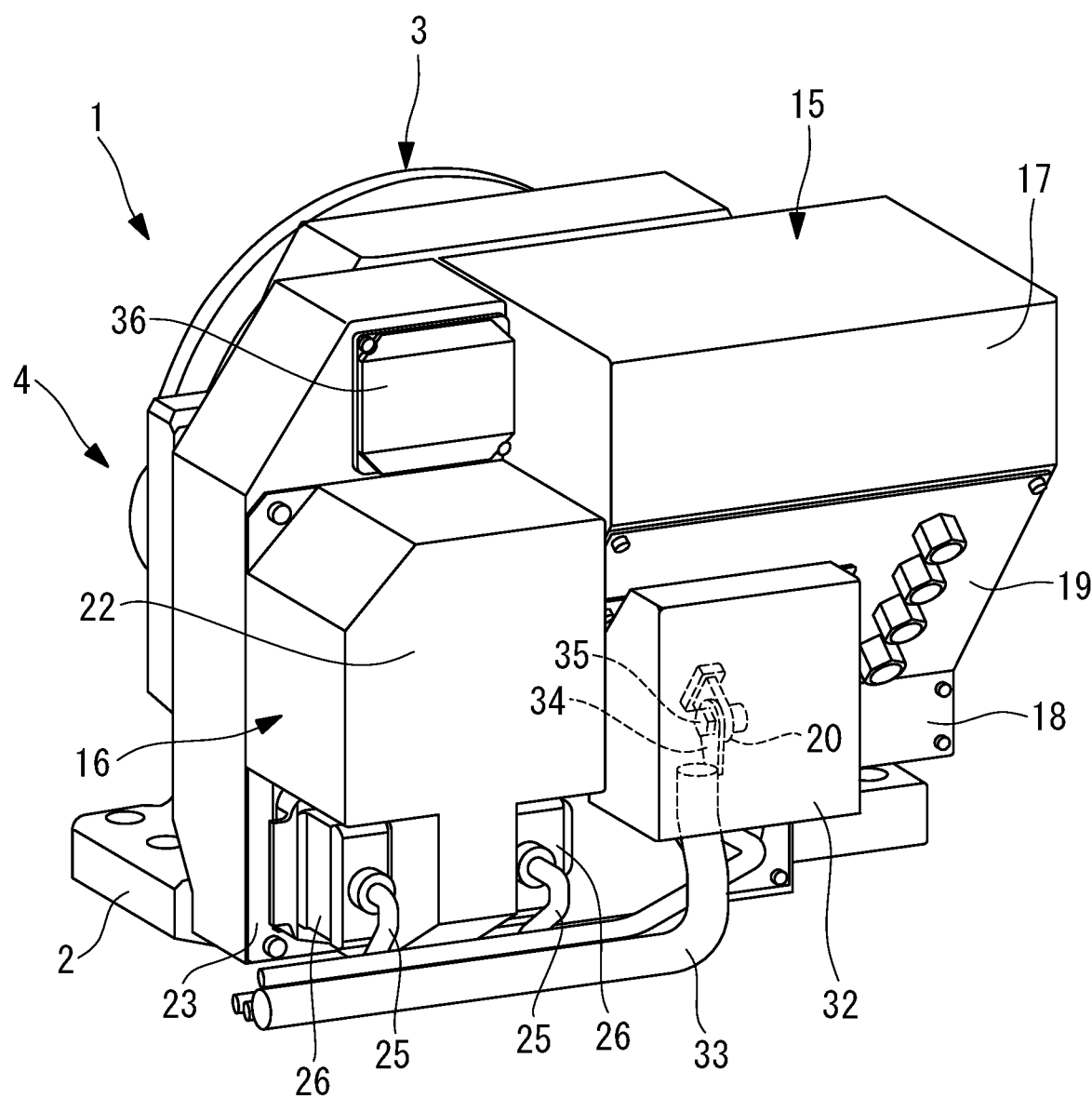
FIG. 9 is a perspective view showing an example in which the external cable and the external motor cable are led to the left side, as opposed to those in FIG. 7.

As shown in FIG. 7 or 9, the external cable 33 connected to the connection terminal 20 is led downward and bent to the right side or to the left side of the workpiece support device 1, as necessary. By doing so, the wiring direction of the external cable 33 may be selected from the left side and the right side. Because the workpiece support device 1 does not need to be disassembled at this time, changing of parts and troublesome disassembly/assembly work are unnecessary. Even after the workpiece support device 1 has been installed, the wiring direction can be changed simply by changing the bending direction of the external cable 33, which is advantageous.

In this embodiment, because the connection terminal 20 is accommodated in the recess formed below the upper back-plate portion 17, accumulation of dust on the connection terminal 20 can be prevented. Because the connection terminal 20 is provided on the inclined back-plate portion 19, the task of connecting the external cable 33 to the connection terminal 20 from the rear side of the workpiece support device 1 can be performed while viewing the connection terminal 20, which is advantageous.

In this embodiment, the connection terminal 20 is provided on the inclined back-plate portion 19 that extends obliquely downward toward the front side from the lower part of the upper back-plate portion 17. Hence, as shown in FIG. 5, a sufficient space for wiring the relatively thick and rigid conducting cables 21, which connect the collecting brushes 14 and the connection terminal 20, is ensured in the liquid-proof cover 15. As a result, it is possible to prevent an excessive force from remaining in the conducting cables 21 after wiring and thus to more reliably maintain the collecting brushes 14 and the outer circumferential surface 5a of the shaft 5 in tight contact with each other.

In this embodiment, by providing the motor connectors 24 on the motor cover 16 and by connecting thereto the connectors 26 of the external motor cables 25 from the rear side of the workpiece support device 1, the connectors 26 are accommodated in the recess recessed further toward the front side than the back-plate cover portion 22. As shown in FIG. 7, this enables the connectors 26 to be disposed at a position not projecting backward from the rear end of the motor 7. The external motor cables 25 may be led either to the left or right direction without projecting from the rear end of the motor 7, simply by bending the external motor cables 25 to the right side or to the left side near the position where they are led out from the position connectors 26, as shown in FIG. 7 or 9.

Figure 10:
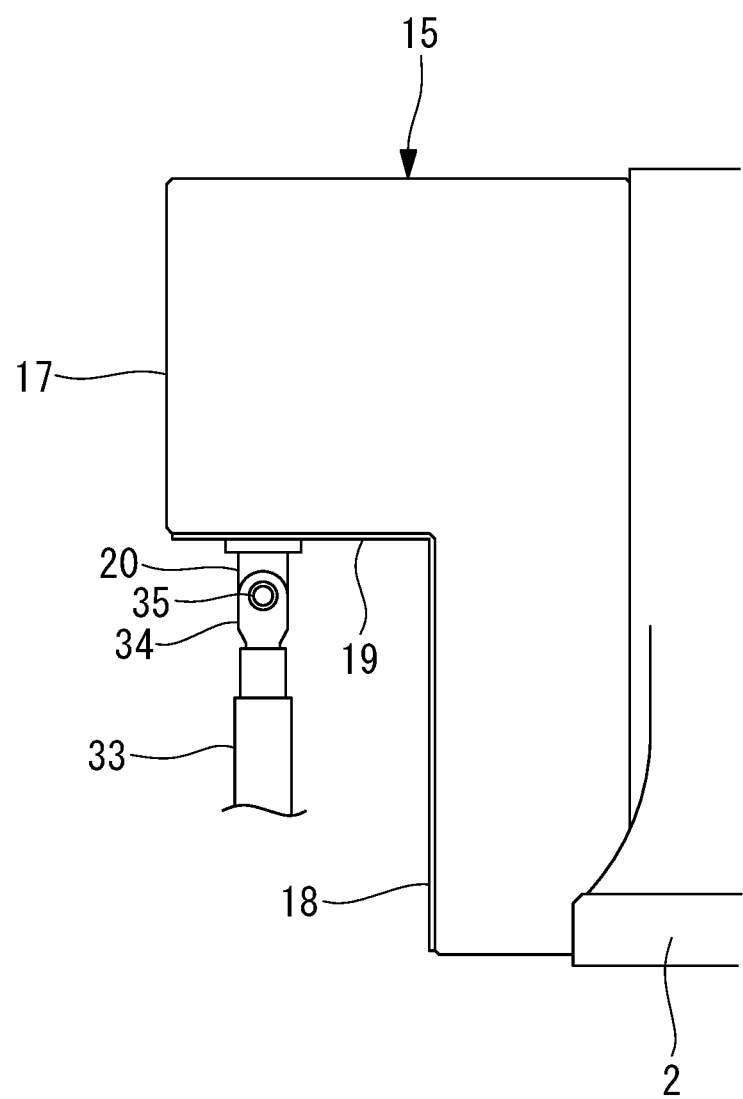
FIG. 10 is a side view showing a modification of a liquid-proof cover having a shape different from that in FIG. 8.
Figure 11:
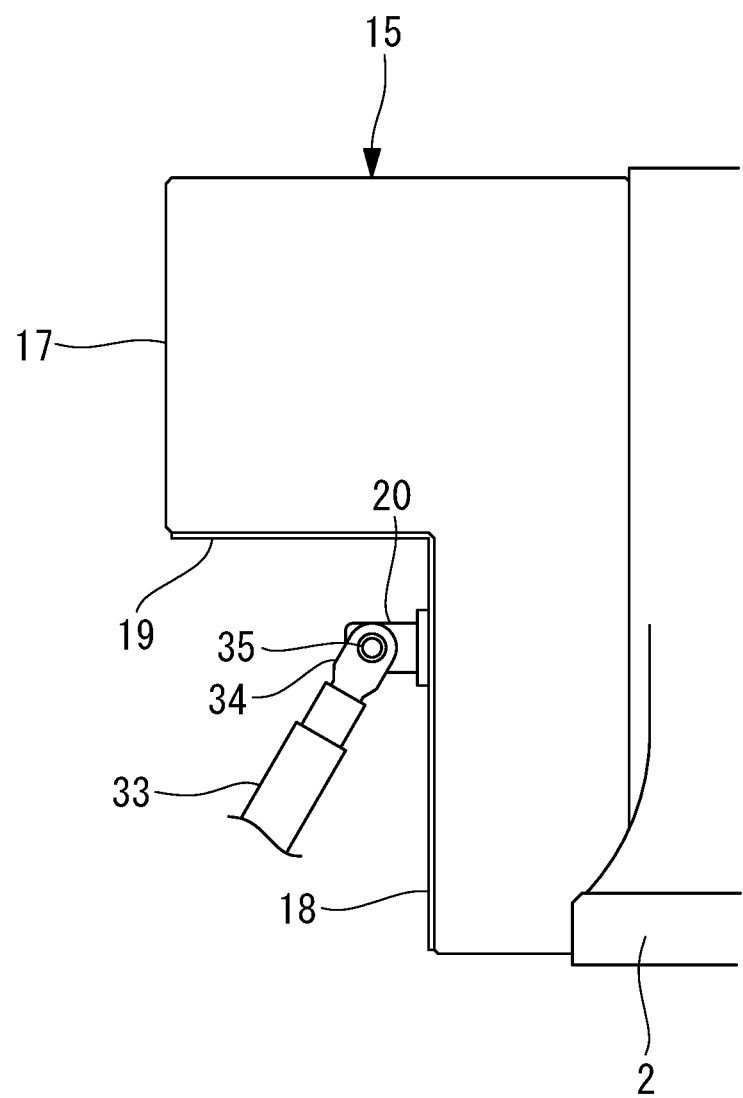
FIG. 11 is a side view showing a modification in which the connection terminal is provided on the vertical surface in FIG. 10.

Although the connection terminal 20 is disposed on the inclined back-plate portion 19 in the workpiece support device 1 according to this embodiment, the configuration is not limited thereto, and the connection terminal 20 only needs to be exposed in the recess formed below the upper back-plate portion 17. For example, as shown in FIG. 10, the inclined back-plate portion 19 may extend in the horizontal direction. The connection terminal 20 may be provided on a vertically extending portion provided at the far end of the recess, as shown in FIG. 11.

Although the motor cover 16 is provided in this embodiment, the motor cover 16 does not necessarily have to be provided. As shown in FIG. 7, a battery box 36 may be attached to the motor cover 16.

In this embodiment, an example case where the motor 7 is provided directly beside the shaft 5, which is fixed to the rotary table 3, has been described. This configuration reduces the overall height of the workpiece support device 1. Instead of this, the motor 7 may be provided vertically above the shaft 5. This configuration reduces the overall width of the workpiece support device 1.

Although the collecting brushes 14 are provided at two positions on the shaft 5, i.e., above and below the shaft 5, the collecting brushes 14 may be provided at other arbitrary positions in the circumferential direction instead. The number of collecting brushes 14 may be one.

The invention claimed is:

1. A workpiece support device comprising:
   a base;
   a conducting rotary table that supports a workpiece and that is supported by the base so as to be rotatable about a horizontal rotation axis;
   a motor that is disposed parallel to, and offset from, the rotation axis and that rotationally drives the rotary table;
   a collecting brush disposed on the rear side of the base so as to be slidable on the outer circumferential surface of a conducting shaft fixed to the rotary table and extending along the rotation axis;
   a connection terminal that is electrically connected to the collecting brush by a conducting member and to which an external cable connected to an external welding power supply is connected; and
   a liquid-proof cover surrounding the collecting brush and the outer circumferential surface of the shaft in a liquid-tight state,
   wherein the liquid-proof cover includes an upper back-plate portion that is disposed at substantially the same position as the rear end of the motor, and a lower back-plate portion located below the upper back-plate portion and forming a recess recessed toward the front side, and
   the connection terminal penetrates through the lower back-plate portion in the thickness direction thereof and projects into the recess.

2. The workpiece support device according to claim 1, wherein
   the lower back-plate portion has an inclined portion inclined downward toward the front side from the upper back-plate portion, and
   the connection terminal is disposed at the inclined portion.

3. The workpiece support device according to claim 1, further comprising:
   a motor cover surrounding the motor in a liquid-tight state;
   a motor connector that is provided through the motor cover and to which an external motor cable is connected;
   and a relay cable connecting the motor connector and the motor,
   wherein the motor cover has a back-plate cover portion covering the rear end of the motor, and a recess cover portion recessed further toward the front side than the back-plate cover portion, and
   the motor connector is provided at the recess cover portion.

* * * * *